Patented Sept. 29, 1942

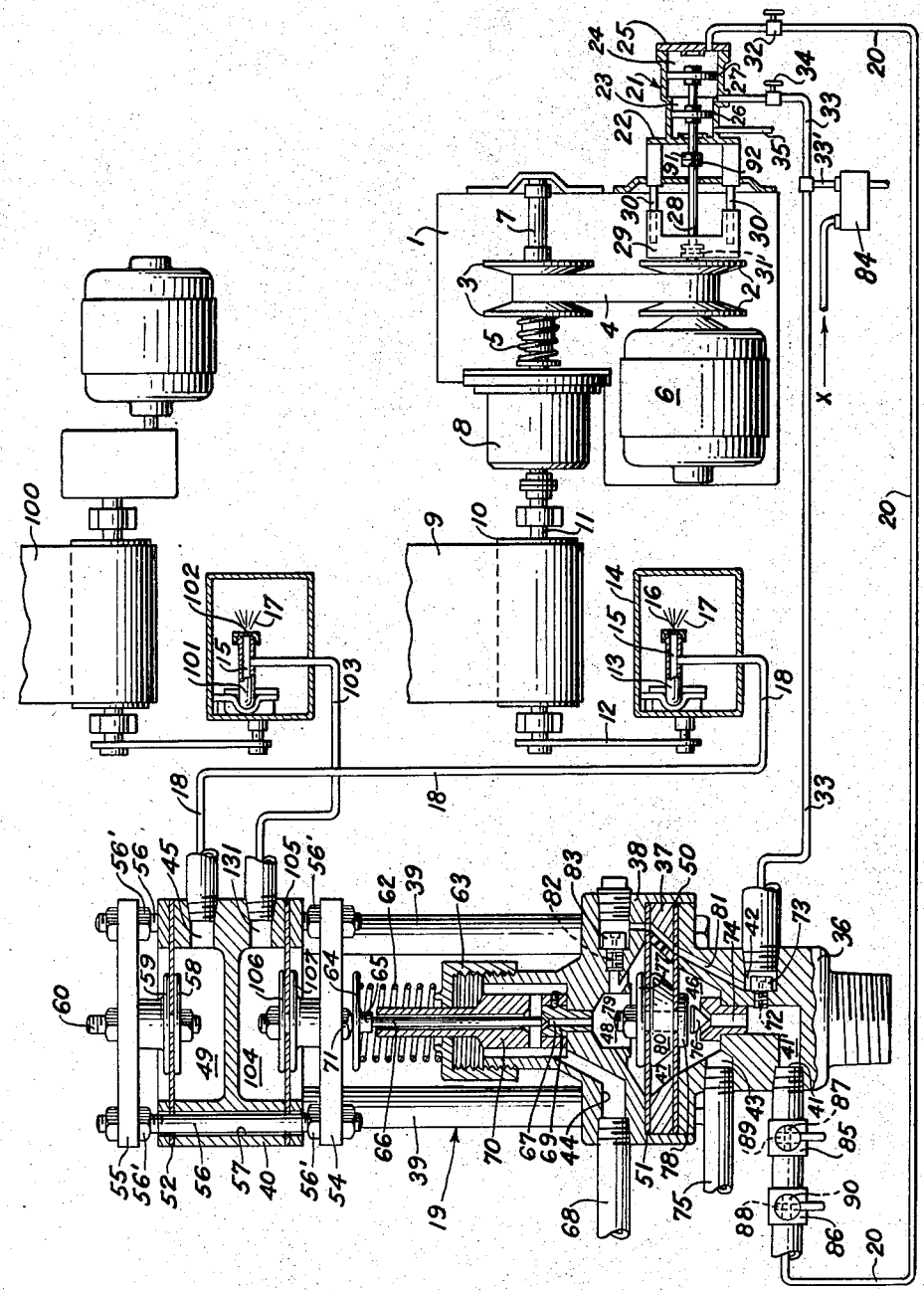

2,296,979

UNITED STATES PATENT OFFICE 2,296,979

AUTOMATIC VARIABLE SPEED CONTROL APPARATUS

Hugh J. Byrne, Oakland, Calif.

Original application February 15, 1937, Serial No. 125,822. Divided and this application November 7, 1939, Serial No. 303,251

7 Claims. (Cl. 74—389)

This application is a divisional application from my parent co-pending patent application Serial No. 125,822, filed February 15, 1937, which was issued on December 5, 1939, as Patent No. 2,182,310.

The invention herein relates to automatic means for controlling the speed of a machine driven by a variable speed transmission in some desired relation to the speed of and by an independently driven machine, or to a plurality of machines each driven by a variable speed transmission in some desired relation to the speed of and by such an independently driven machine. A further object of the invention is to provide means for the purpose above set out and which will provide for changing the speed of the variable speed transmission driven machine or machines relative to the speed of the independently driven machine from a remote point. Further objects are reliability of performance, simplicity of construction and low cost of equipment compared to the cost of prior apparatus for similar purposes. Other objects and/or advantages will appear in the following specification and accompanying drawing.

The drawing shows a schematic plan of a variable speed transmission for operating a conveyor at some speed relative to that of an independently driven conveyor or similar machine with necessary control equipment for varying the speed of the variable speed transmission driven machine.

Before describing the invention in detail it may be stated that many types of industrial machinery are driven through the intermediary of a variable speed transmission, that probably the most common of such transmissions is the "Reeves variable speed transmission" and for which, together with similar transmissions having a shiftable speed changing element, the invention is primarily concerned.

The variable speed transmission comprises a frame 1 with two pairs of confronting cone pulleys 2 and 3 rotatably mounted on the frame, each pair respectively on the driving and driven shaft, and the pulleys connected by a special beveled edge belt 4, the arrangement being such as to permit the pulleys of each pair to open and close, that is those of each pair can approach each other axially on their respective shafts, to force the belt to ride at different cone diameters depending upon the spacing of the pulleys of each pair, the usual construction providing hand-operated means, not shown, for opening and closing one pair of pulleys, and a spring 5 acting on the other pair of pulleys 3 forcing them to assume the proper position to accommodate the particular cone diameter where the belt is riding on the pulleys. Some of the models have a leverage arrangement for positively closing one pair of pulleys proportionately as the other pair is opened from the same leverage system.

The present invention automatically operates the pulleys under control so that the speed of the variable speed transmission driven machine is operated at a desired speed relative to or proportional to the speed of an independently driven machine.

The drawing shows my apparatus to be operatively connected for shifting the driving pulleys 2, although it may operate either or both pair, depending upon the particular construction of the variable speed transmission, and the driving pulleys, or rather the shaft upon which they are mounted (not shown) is driven by any source of mechanical power, generally a motor 6, and a driven pulley shaft 7, which may extend through a set of reduction gears in a casing 8, and which may or may not incorporate a suitable clutch for disconnecting the driven machine from the driven shaft of the variable speed transmission if desired.

The driven machine is a belt conveyor 9 passing over a driving pulley 10 mounted on a shaft 11 which is connected to the reduction gears on the variable speed transmission output shaft or driven shaft 7, as may be desired.

The pulley of the pair 2 nearest the motor 6 revolves at substantially constant speed in one plane, or in other words it is not moved axially. The other pulley of this pair is arranged to be moved axially, and obviously as it is moved toward the motor 6 the output speed of the transmission and that of the conveyor 9 is increased. A servo-motor hydraulic cylinder 21 is firmly mounted on the transmission case by a suitable bracket 22 in such a manner that it and the cone pulleys 2 have a common axis. Servo-motor cylinder 21 is really two cylinders of different diameters, or one casting bored out to form an inner cylinder 23 with a larger cylinder 24 extending outwardly therefrom and closed by a cylinder head 25. The smaller and larger cylinders are provided with nicely fitted pistons 26 and 27 respectively, of any approved design, including the usual cup leathers or sealing rings, spacedly secured to a common piston rod 28 which is secured at its inner end to a yoke 29 slidably supported on two guides 30, which yoke engages a suitable anti-friction collar 31 on the outer of pulleys 2 for sliding this pulley back and forth as the pistons are moved outward and inward respectively in their cylinders. The position of the slidable pulley 2 and likewise the speed of the conveyor 9 is varied through the action of the pilot valve 19 which controls fluid flow through pipes 20 and 33. Pipe 20 enters the outer end of the large diameter cylinder 24 through cylinder head 25 and may be conveniently provided with a shut-off valve 32. Pipe 33 enters the small diameter cylinder 23 at its outer end and this line may also be conveniently provided with a shut-off valve 34. Cylinder 23 is also provided with a drain pipe 35 to carry away any seepage which may get past piston 26. With the construction of the two diameter cylinder 21 having the two different sized pistons in it as described, a differential piston is provided so that with fluid at the same pressure supplied to both cylinders through pipes 20 and 33, the piston assembly, yoke 29, and outer pulley 2 would move inward or to the left in the figure (by reason of the greater area of the piston in the outer cylinder) to thereby move the pair of cone pulleys 2 closer together, and force the belt 4 to ride at a larger diameter on these pulleys while at the same time reduce the diameter of the pulleys 3 where the belt 4 is in contact with same and thus increase the speed of the driven shaft 7 and conveyor 9.

If the fluid pressure in the outer end of cylinder 24 is lowered by any means to a point where the force on the right side of piston 27 is less than the differential force tending to move the piston assembly to the right, which differential force is the result of the full supply pressure being between pistons 26 and 27 at all times and the difference in area between these two pistons, the assemblage including the outer of cone pulleys 2 will move outward and thereby reduce the speed of the driven shaft 7 and conveyor 9.

By the use of two different sized pistons secured to one piston rod and working in a cylinder having differential bores as described, the necessity for stuffing boxes on the piston rod is avoided thereby eliminating a factor which could affect sensitiveness and response of control through friction. This system also makes it possible to use a two-way pilot by which displacement of the piston assembly is produced through controlling fluid flow in pipe line 20, pipe line 33 always carrying uncontrolled supply pressure. Actually the pilot valve does control fluid flow in pipe line 33 because fluid must necessarily flow out of the small diameter cylinder 23 when the pilot valve causes fluid to flow into the large diameter cylinder 24 through pipe line 20.

The length of stroke of the piston assembly and consequent movement of the cone pulleys in either direction may be limited by stopnuts 91 and 92 to adjustably vary the speed range of the transmission.

In practice uncontrolled fluid pressure, from a reasonably constant pressure source, is maintained in pipe 33, through branch pipe 33', from any desired source X and the pressure in pipe 20 is varied through the action of the automatic pilot which is influenced by the pressures in diaphragm chambers 49 and 104 and the compression loading of spring 62. The fluid source X is cleansed of foreign matter by passing through a filter, or strainer 84, before passing through branch pipe 33' principally to prevent fouling the orifices of the pilot valve which will be discussed below.

The pilot 19, shown enlarged in the drawing, comprises a suitably supported fixed body, generally located at the desired remote control point, although it may be close to the variable speed transmission if desired. The body is made of several pieces 36, 37, 38, 39 and 40 suitably secured together and formed to provide several threaded ports 41, 42, 43, 44, 45 and 131 and chambers 41', 46, 47, 48, 49 and 104, as shown, and with flexible (preferably rubber fabric) diaphragms 50 and 51, separating chamber 47 from chambers 46 and 48, a similar diaphragm 105 closing the lower side of chamber 104 and a similar diaphragm 52 closing the upper side of chamber 49. Chambers 49 and 104 constitute a differential pressure head. Chambers 49 and 104 are a part of member 40 which is fixedly supported on uprights 39. A means of providing vertical movement through head 40 consists of a pair of plates 54 and 55 and spaced bolts 56 which are slidable in vertical openings 57 in member 40, the travel being limited by nuts 56' on bolts 56. Plates 54 and 55 are secured to diaphragm 52 by clamping washers 58 and 59 and bolt 60 and to diaphragm 105 by clamping washers 106 and 107 and bolt 71 the head of which is rounded and bears against the top of a flat flange 64 being so constructed to eliminate the necessity of securing perfect alignment with needle valve 66 when operating same. A compression spring 62 is provided reacting between an adjusting nut 63 and the lower side of flange 64 secured to or formed on the upper enlarged portion 65 of the needle valve 66, and which needle valve is adapted to more or less close a relief passage 67 leading from chamber 48 to port 44 and waste pipe 68. The structure includes, for purposes of construction, securely aligned nipples 69 and 70 for facilitating alignment of the relief passage 67 with needle valve 66. Where close alignment is necessary it has been provided, but wherever possible the structure has been made to eliminate the necessity of close alignment. However, the foregoing details of construction may be varied considerably.

The driven shaft 11 of the variable speed transmission driven conveyor 9 and that of the independently driven conveyor 100 are connected by independent chain drive 12, or other positive driving means, to small rotary pumps 13 and 101 of the positive type, such as a gear or eccentric pump, operating in or over tanks 14 and arranged to draw a liquid, preferably oil 15, therefrom and force the oil to flow through a restricted port at 16 and 102 to discharge back into the tanks as at 17, while at the same time build up a pressure on the side outlet pipes 18 and 103 of the transmission driven and independently driven machines respectively. Pressure from the side outlet pipes 18 and 103 is transmitted to diaphragm chambers 49 and 104 respectively.

With the arrangement shown providing opposing forces on the yoke assembly 54, 55 and 56 resulting from the pressures in chambers 49 and 104 producing a differential force opposing that of the compression spring 62, the elevation of the needle valve 66 will be affected by the balance between this differential force and the force of the spring.

Port 41 connects to pipe 20 from the larger bore of cylinder 21, while port 42 connects to pipe 33 from the smaller bore of cylinder 21 and communicates with a chamber or extension 41' of port 41 through a small restricted passage or orifice 72 in a threaded nozzle 73. Chamber 41' communicates by way of a small passage 74 with port 43 through chamber 46 to waste pipe 75, and passage 74 is beveled outwardly at its upper end and surmounted with a loose or floating conical valve 76 which may be forced downward to more or less close the passage 74 upon downward flexing of diaphragms 50 and 51 which are clamped firmly at their margins to the pilot structure 36, 37 and 38 and which are also clamped at their centers by washers 77 and 78, the latter of which may be the head of a bolt 79 which passes through a tapered spacer 80, so that the diaphragms will flex together when the pressure is varied above diaphragm 51.

Extending from port 42 is a small passage 81 which continues through the clamped margins of both diaphragms 50 and 51 as indicated and connects with chamber 47 and also connects through a restricted passage or orifice 82 in a threaded nozzle 83 with chamber 48.

To definitely limit the speed of shifting the transmission shiftable pulley 2 by the hydraulic cylinder 21, one or more service cocks 85 and 86 with plugs having a different fixed size restricted opening 87 and 88, may be included in pipe 20, each plug also having a large bore 89 and 90, equal to the maximum capacity desired for pipe 20. Thus by simply throwing either plug to bring its restricted opening in line with the pipe and the other with its large opening in line with the pipe the desired speed of operation of the control may be had without the use of needle valve adjustment which is uncertain and objectionable.

From chamber 48 fluid can flow past the needle valve 66 at a rate dependent upon its approach to the opening at the top of nipple 69 and if liquid is used it will flow out through waste pipe 68. Chamber 47 is always open to full supply pressure of the liquid or fluid as the case may be. Chamber 41' leads back through port 41, pipe 20 and cocks 85 and 86 to the outer end of large diameter cylinder bore 24 and also by way of passage 74 past floating valve 76 to waste pipe 75. The pressure in the large diameter cylinder 24 will therefore depend upon the opening of valve 76 as it controls a fluid outlet that is of far greater cross section than that of restricted inlet orifice 72, and when valve 76 is fully open the pressure in chamber 41', pipe 20 and cylinder 24 (between piston 27 and cylinder head 25) can drop to almost zero thereby causing outward movement of the piston assembly and diminishing speed of conveyor 9. Actually a complete reversal in piston assembly movement can be accomplished on a small change of pressure in chamber 41'.

A change of oil pump pressure from either pump 13 or 101 occurring simultaneously with a change in conveyor speeds 9 or 100 respectively controls the degree of opening of the needle valve 66 (which is never quite closed) and thereby varies the pressure in chamber 48 and its effect upon diaphragm 51. Full pressure being always maintained in chamber 47, from passage 81, produces a constant upward force on plug 80 due to the difference of the areas of diaphragms 50 and 51 that is exposed to fluid pressure in chamber 47, and if the pressure in chamber 48 falls to a value approximating one-half of the pressure in chamber 47, as it would when needle valve 66 is raised, disc 78 rises and permits floating valve 76 (preferably made of hard rubber or similar material) to rise, and thereby reduce the pressure in chamber 41' to a minimum causing outward movement of the piston assembly and diminishing speed of conveyor 9, as explained above, and occurring when the compression spring 62 upward thrust is greater than the downward load on plate 54 due to the greater pressure in chamber 104 than that in chamber 49. If the difference in pressures in chambers 49 and 104 is such that the differential force resulting from these pressures on plate 54 depresses 54 downward because said differential force is greater than the upward thrust of spring 62 the needle valve 66 will be depressed restricting the flow through orifice 67 which will raise the pressure in chamber 48 and overcoming the normal upward thrust on plug 80 (explained above) cause the plug, discs 77 and 78, center portions of diaphragms 50 and 51 and the floating needle 76 to move downward to restrict the flow from orifice 74. This results in an increased pressure in chamber 41' which is transmitted by line 20 to cylinder 24 causing the piston assembly to move inward and increase the speed of conveyor 9.

Orifice 74 and floating needle 76 are very inexpensive and when the cost of fluid used is a factor they can be replaced by a two-way slide valve (which has a negligible waste) that can be moved vertically downward by disc 78 to open a supply port in a sleeve fixed in chamber 41' while holding an exhaust port on the same sleeve closed to cause fluid to flow to cylinder 24 and conversely when disc 78 is raised it would permit the slide valve to rise and fluid to return from cylinder 24 by the supply port being closed and the exhaust port being opened. With such an arrangement orifice 72 would not be used, supply line 33 would feed fluid to the base of the slide valve and sleeve, and line 20 would connect through body 36 to the sleeve at any point between the sleeve ports, the upper port being the exhaust and the lower port being the supply port. Supply pressure would tend to lift the slide valve and this upward force could be assisted by a small spring at the base of the slide valve.

The above arrangement would eliminate the continuous flow of fluid through orifice 74 by replacing a friction-free valve 76 with an equivalent valve in result but one that would not be friction-free. However, friction in such a valve is of no consequence due to the relatively great operating force afforded by diaphragm 51 and the continued use of a friction-free primary source of control, namely; the needle 66 which has a very loose fit in its guide piece 70. In practice the needle valve 66 is always riding on a small jet of liquid or fluid issuing from orifice 67 and the actual movement up and down is only about .003".

By the action described the speed of conveyor 9 will be very accurately controlled with respect to the speed of conveyor 100 for all relative speed adjustments effected by the loading of compression spring 62 through adjusting nut 63, in a manner described as follows:

The conveyor shown as 100 forms what may be termed a base load, or base speed conveyor, from which the speed of another conveyor 9, or several other similar conveyors, (not shown) is automatically controlled through my apparatus. If it is desired to operate conveyor 9 at exactly the same speed as conveyor 100, positive displacement pumps 13 and 101 being of the same capacity and operating at the same speed when conveyors 9 and 100 are operating at the same speed and orifices 16 and 102 are of the same size, then the compression spring 62 must necessarily be adjusted by nut 63 so that the upward thrust of spring 62 is equal to the weight of the metal parts 54, 55, 56, 56', 58, 59, 60, 106, 107 and 71.

Under this condition the upward force on diaphragm 52, due to the pressure in chamber 49 resulting from the speed of pump 13, is equal to the pressure in chamber 104 resulting from the speed of pump 101. Under such an equalized condition of pressures in chambers 49 and 104, the pilot 19 holds the piston assembly in cylinder 21 in a fixed position as explained in the foregoing.

If for any reason, such as due to decreasing the load on conveyor 100, the speed of this conveyor increases, the speed of pump 101 will simultaneously increase in direct proportion. An increase of speed of pump 101 will cause an increase in its discharge pressure forcing more oil through orifice 102, and this increased pressure will be simultaneously transmitted through pipe 103 and port 131 to diaphragm chamber 104. Increasing the pressure in diaphragm chamber 104 will depress the yoke assembly 54, 55 and 56, which in turn will also depress needle valve 66, and through the action of the pilot 19, explained in the foregoing, will move the piston assembly 26, 27 and 28 to the left, thereby increasing the speed of conveyor 9. As the speed of conveyor 9 increases, the speed of pump 13 simultaneously increases, thereby increasing its discharge pressure forcing more oil through orifice 16, and this increased pressure will be simultaneously transmitted through pipe 18 and port 45 to diaphragm chamber 49. Conveyor speed 9 will continue to increase until the pressure in chamber 49 is equal to the pressure in chamber 104, under which condition the pilot is then restored to neutral and the position of piston assembly 26, 27 and 28 is fixed.

Conversely, if for any reason, such as due to increasing the load on conveyor 100, the speed of this conveyor decreases, the speed of pump 101 will simultaneously decrease in direct proportion. A decrease of speed of pump 101 will cause a decrease in its discharge pressure forcing less oil through orifice 102, and this decreased pressure will be simultaneously transmitted through pipe 103 and port 131 to diaphragm chamber 104. Decreasing the pressure in chamber 104 will permit the yoke assembly 54, 55 and 56 to rise, thereby permitting needle valve 66 to rise, which, through the action of pilot 19, explained in the foregoing, will move the piston assembly 26, 27 and 28 to the right, thereby decreasing the speed of conveyor 9. As the speed of conveyor 9 decreases, the speed of pump 13 simultaneously decreases in direct proportion, thereby decreasing its discharge pressure forcing less oil through orifice 16, and this decreased pressure will be transmitted through pipe 18 and port 45 to diaphragm chamber 49. The speed of conveyor 9 will continue to decrease until the pressure in chamber 49 is equal to the pressure in chamber 104, under which condition the pilot is then restored to neutral and the position of piston assembly 26, 27 and 28 is fixed.

Obviously the relative speeds of conveyors 9 and 100 can be governed by the selection of pumps 13 and 101, speed ratios between these pumps and their driving members, the size of orifices 16 and 102 and adjustment of spring 62. It is apparent that any desired relation between the speed of conveyors 9 and 100 can be attained, and, further, the accuracy of the relative speed can be held within very close limits by the extremely sensitive and accurate pilot valve 19.

Whereas the discussion is related to the control of a conveyor 9 with respect to a conveyor 100, the conveyor 9 could be replaced by a pump delivering a fluid through an orifice; the pressure from the upstream and downstream taps of the orifice being transmitted to two chambers of a triple-pressure diaphragm chamber pilot head instead of a double-pressure diaphragm chamber pilot head (as shown) so as to proportion the flow of fluid to the speed of a conveyor 100. Conversely, the speed of a conveyor can be controlled by a similar triple-pressure diaphragm chamber pilot head in proportion to the flow of fluid through an orifice. Likewise, the flow of a fluid delivered from a variable speed transmission driven device can be proportioned to the flow of another fluid delivered from an independent source through another orifice by means of a quadruple-pressure diaphragm chamber pilot head. As these several variations are comparable to the arrangement shown in the drawing and differ only in mechanics, additional drawings showing these modifications are not deemed necessary and, accordingly, are not presented herein.

Having thus described my improved control for equipment driven by a variable speed transmission of the Reeves type and some of the various arrangements it may take, it will be evident that it will also operate on other speed reducing devices provided with a member for moving back and forth to change the speed, which may be operated pneumatically or hydraulically by the shifting arrangement shown in the drawing. Further, the use of a liquid in cylinders 23 and 24 provides a definite locked position of the shaft or pulley shifting rod 28 and insures against any change in adjustment of pulleys 2 until moved by pilot action; yet a gas, such as air, might be used instead of a liquid where inferior results would satisfy. Hence, any use of air or gas in place of the hydraulic means shown and described herein is to that extent intended to be covered as an inferior substitute in the appended claims where use of the words hydraulic and liquid are employed.

I claim:

1. Means for controlling the speed of an industrial machine driven by a variable speed transmission having a shiftable element for changing its speed which comprises providing fluid operated means for shifting said element, means for admitting fluid under pressure to said fluid operated means for operating the same, a pilot for controlling the pressure of the fluid passing to said fluid operated means, a first means for independently influencing said pilot dependent upon the speed of the industrial machine driven by said variable speed transmission, a second industrial machine independently driven, and a second means separate from said first means actuated by said second industrial machine arranged to modify the influencing of said pilot in accordance with the speed of said second industrial machine, both of said industrial machines being separately and independently driven.

2. In a combination of two industrial machines, one machine separately and independently driven, and the other machine separately and independently driven through a variable speed transmission having a shiftable element for changing its speed, a control pilot, means for shifting said element under control of said pilot, pressure generating devices for and driven by each machine respectively, pressure responsive means for controlling the operation of said pilot comprising separate independent pressure systems extending respectively from said devices arranged for reversely affecting the operation of said pilot for shifting said element in opposite directions as may be required to hold the speed of said variable speed transmission driven machine at any desired speed ratio with respect to the speed of the independently driven machine.

3. In the combination set out in claim 2, means for varying the effectiveness of response to the pressures from said devices.

4. In a structure as set out in claim 2, said pressure responsive means including a differential pressure head to which the pressures from said devices are exposed in opposed relation.

5. In a combination of two industrial machines, one machine separately and independently driven, and the other machine separately and independently driven through a variable speed transmission having a shiftable element for changing its speed, a servo-motor for shifting said element, a control pilot, means for operating said servo-motor for shifting said element under control of said pilot, pressure generating devices for and driven by each machine respectively, pressure responsive means for controlling the operation of said pilot comprising separate independent pressure systems extending respectively from said devices arranged for reversely affecting the operation of said pilot for shifting said element in opposite directions as may be required to hold the speed of said variable speed transmission driven machine at any desired speed ratio with respect to the speed of the independently driven machine.

6. In a combination of two industrial machines, one machine separately and independently driven, and the other machine separately and independently driven through a variable speed transmission having a shiftable speed changing element, means for automatically shifting said element comprising separate and independent fluid pressure lines, fluid pressure generating devices operated respectively by each machine arranged for varying the pressure respectively in said lines in conformity with the speeds of said machines, a power cylinder connected to and for positively shifting said element, pipe means for introducing fluid under pressure to said cylinder for operating the same, a pilot valve controlling flow of fluid in said pipe means, and means for controlling said pilot valve in response to varying pressures in said fluid pressure lines to keep the speed of the variable speed transmission driven machine in any desired ratio to the speed of the independently driven machine.

7. In a combination of two industrial machines each arranged to produce the flow of material therefrom, one machine separately and independently driven, and one machine separately and independently driven through a variable speed transmission having a shiftable element for changing its speed, a control pilot, means for shifting said element under control of said pilot, pressure means comprising a separate independent pressure system extending from each of said machines arranged for respectively reversely controlling said pilot to keep the material rate of flow from the variable speed transmission driven machine in any desired ratio to the material rate of flow from the independently driven machine.

HUGH J. BYRNE.